United States Patent
Goodno

(10) Patent No.: US 8,792,526 B2
(45) Date of Patent: Jul. 29, 2014

(54) COHERENT LASER ARRAY CONTROL SYSTEM AND METHOD

(75) Inventor: Gregory D. Goodno, Los Angeles, CA (US)

(73) Assignee: Northrop Grumman Systems Corporation, Falls Church, VA (US)

(*) Notice: Subject to any disclaimer, the term of this patent is extended or adjusted under 35 U.S.C. 154(b) by 197 days.

(21) Appl. No.: 13/479,760

(22) Filed: May 24, 2012

(65) Prior Publication Data

US 2013/0315271 A1    Nov. 28, 2013

(51) Int. Cl.
*H01S 3/13*    (2006.01)

(52) U.S. Cl.
USPC ............... 372/29.023; 372/29.016; 372/38.01

(58) Field of Classification Search
CPC ............ H01S 3/10007; H01S 3/10015; H01S 3/10023; H01S 3/10053
USPC ............. 372/29.023, 29.016, 38.01; 359/337, 359/349

See application file for complete search history.

(56) References Cited

U.S. PATENT DOCUMENTS

| | | | |
|---|---|---|---|
| 7,626,759 B2 | 12/2009 | Betin et al. | |
| 7,884,997 B2 | 2/2011 | Goodno | |
| 7,949,030 B2 | 5/2011 | Volodin | |
| 8,035,890 B2 | 10/2011 | Kong et al. | |
| 8,548,017 B1 * | 10/2013 | O'Loughlin et al. | ..... 372/29.016 |
| 2008/0253415 A1 * | 10/2008 | Livingston | ................. 372/38.01 |
| 2011/0235049 A1 | 9/2011 | Burnett et al. | |

OTHER PUBLICATIONS

Goodno, et al.: "*Perturbative Analysis of Coherent Combining Efficiency with Mismatched Lasers*"; Optics Express, Nov. 22, 2010, vol. 18, No. 24, pp. 25403-25414.

Vorontsov, et al.: "*Adaptive Array of Phse-Locked Fiber Collimators: Analysis and Experimental Demonstration*"; IEEE Journal of Selected Topics in Quantum Electronics, vol. 15, No. 2, Mar./Apr. 2009, pp. 269-280.

* cited by examiner

*Primary Examiner* — Yuanda Zhang
*Assistant Examiner* — Michael Carter
(74) *Attorney, Agent, or Firm* — Tarolli, Sundheim, Covell & Tummino LLP

(57) ABSTRACT

In one embodiment, a system includes a master oscillator for generating a primary laser signal. A plurality of amplifiers amplifies a plurality of secondary laser signals and generates a plurality of amplified laser signals. A plurality of actuators adjusts a position, a beam angle, a path length, and a phase of the plurality of amplified laser signals. At least one control module controls the plurality of actuators that adjust the position, the beam angle, the path length, and the phase of the plurality of amplified laser signals. A combiner receives the amplified laser signals to generate a combined laser output signal. At least one filter samples the combined laser output signal to generate a plurality of phase errors as feedback for the control module to control at least one of the position, the beam angle, or the path length for the plurality of amplified laser signals.

18 Claims, 4 Drawing Sheets

COHERENT LASER ARRAY CONTROL SYSTEM AND METHOD

TECHNICAL FIELD

The present invention relates generally to optics, and more particularly to a system and method for combining multiple beams in a coherent laser array.

BACKGROUND

Coherent beam combination (CBC) of laser amplifiers is a well-established technique for locking multiple laser emitters in phase with one another to form a high brightness beam. Typically, the output from a low-power master oscillator is split into a multiplicity of beams, each of which is passed through a laser amplifier to increase its power. The amplified output beams are combined geometrically and phase-locked to each other. The combined beam behaves as if it were emitted from a single aperture laser, but with higher brightness than can be obtained from an individual laser. The CBC imposes a requirement that the optical path length through each laser amplifier in the phase-locked array must be matched to within a small fraction of the master oscillator's coherence length. If the optical path mismatch between any two elements exceeds the coherence length, then the two elements will appear to be incoherent with one another, and they cannot be successfully phase-locked. Even if the optical path mismatch is only a fraction of the coherence length, the coherence between the two lasers will be less than 100%, leading to a reduction in the array brightness.

Laser beams in a coherently combined array must also be co-aligned with one another to achieve maximum combining efficiency. Each of the lasers must have their beam footprints and their pointing directions overlapped to within a small fraction of the diffraction limit. This is difficult to achieve with high power lasers due to assembly tolerances, dynamic changes in beam parameters, thermal expansion of mechanical fixtures due to stray light absorption, and platform deformations, for example. These problems are particularly acute for systems deployed outside a controlled laboratory environment. Hence, there is a need for active beam pointing and position control systems to maintain coherent combining efficiency.

With a large channel count array, active controls can be cumbersome due to the difficulty of sensing beam parameters for every laser. Most conventional systems require the use of arrays of sampling optics and quad-cell or other position-sensitive detectors (PSDs), one for each input laser, to diagnose misalignments. Large parts count and opto-mechanical complexity make this approach unattractive for deployable systems outside the laboratory. Another disadvantage of multi-detector sensing is that misalignments can be quite subtle and difficult to detect. For example, ±1-µm tip displacements can lead to 1% combining loss for a 20-µm core fiber. At this required high level of precision, slight changes in the relative position or responses of different detectors can easily be misinterpreted as changes in the laser array, thus reducing control fidelity.

For these reasons, single-detector methods of sensing array misalignments provide an attractive alternative to detector arrays. Conventional implementations of single-detector position sensors have required dithering (e.g., causing small beam misalignments) the beam pointing or position, and sensing the resulting loss of combining efficiency. This is undesirable since dithering unavoidably reduces the control precision and limits the final combining efficiency. Moreover, this method does not scale adequately to large arrays (N beams ~>100) since the error signals become attenuated and control bandwidth drops as 1/N.

SUMMARY

In an aspect of the invention, a laser system is provided. The system includes a master oscillator for generating a primary laser signal. This includes a beam splitter array for splitting the primary laser signal into a plurality of secondary laser signals. A plurality of amplifiers amplifies the plurality of secondary laser signals and generates a plurality of amplified laser signals. A plurality of actuators adjusts a position, a beam angle, a path length, and a phase of the plurality of amplified laser signals. At least one control module controls the plurality of actuators that adjust the position, the beam angle, the path length, and the phase of the plurality of amplified laser signals. A combiner receives the plurality of amplified laser signals from the plurality of actuators to generate a combined laser output signal. At least one filter samples the combined laser output signal to generate a plurality of phase errors as feedback for the control module to control at least one of the position, the beam angle, or the path length for the plurality of amplified laser signals.

In another aspect of the invention, a laser system is provided. The laser system includes a master oscillator for generating a primary laser signal and a beam splitter array for splitting the primary laser signal into a plurality of secondary laser signals. A plurality of amplifiers amplify the plurality of secondary laser signals and generate a plurality of amplified laser signals, wherein a plurality of actuators adjust a position, a beam angle, a path length, and a phase of the plurality of amplified laser signals. A phase control module controls a subset of the plurality of actuators that adjust a phase of the plurality of amplified laser signals. A length control module controls a subset of the plurality of actuators that adjust a path length of the plurality of amplified laser signals. A position control module controls a subset of the plurality of actuators that adjust a beam position or beam angle of the plurality of amplified laser signals. A combiner receives the plurality of amplified laser signals from the plurality of actuators to generate a combined laser output signal. A spectral filter samples the combined laser output signal to generate a plurality of phase errors as feedback for the length control module to control the path length for the plurality of amplified laser signals. A spatial filter samples the combined laser output signal to generate a plurality of phase errors as feedback for the position control module to control the beam position or the beam angle for the plurality of amplified laser signals.

In yet another aspect of the invention, a method for coherent beam combination and control is provided. The method includes generating a plurality of secondary laser signals from a primary laser signal and amplifying the plurality of secondary laser signals to generate a plurality of amplified laser signals. The method includes controlling a plurality of actuators to adjust a position, a beam angle, a path length, and a phase of the plurality of amplified laser signals. This includes combining the plurality of amplified laser signals received from the plurality of actuators to generate a combined laser output signal. The method includes filtering the combined laser output signal to generate a plurality of phase errors for the controlling of the plurality of actuators to adjust the position, the beam angle, or the path length for the plurality of amplified laser signals.

DETAILED DESCRIPTION

Systems and methods for coherent laser array control are provided. The systems and methods described herein provide automatic co-alignment of a plurality of coherent laser beams that can be scaled efficiently without corresponding scaling of expensive detection circuits and detector optics. Automatic control (e.g., without dithering) of beam parameters is provided that improves combining efficiency. This includes automated beam positioning, pointing, and optical path length matching, thus providing a useful control to optimize efficiency in coherent laser systems.

In one aspect, an active alignment detection system and method is provided that includes a single detector to sense the positions or pointing angles of all beams in the laser array concurrently. This includes providing high sensitivity to detect beam motions that are a small fraction of the diffraction limit while removing the requirement for beam position or beam pointing dithers associated with conventional system calibration. The number of beams in the array can be efficiently scaled to large channel counts (e.g., >100 beams in the laser array) with auto-alignment of the respective beams provided (e.g., calibration-free). Such features can be enabled by spatially or spectrally filtering the output beam from a coherently combined laser array, where errors in individual beam pointing angles, beam positioning, or beam path mismatches may be transduced into errors in individual beams' piston phases, wherein the term piston is analogous to phase errors. Subsequent application of standard phase-locking methods can then provide feedback error signals to control modules that control an associated actuator to null out the piston phase errors on each beam, thus automatically causing the beams to be in desired co-alignment.

Figure 1:
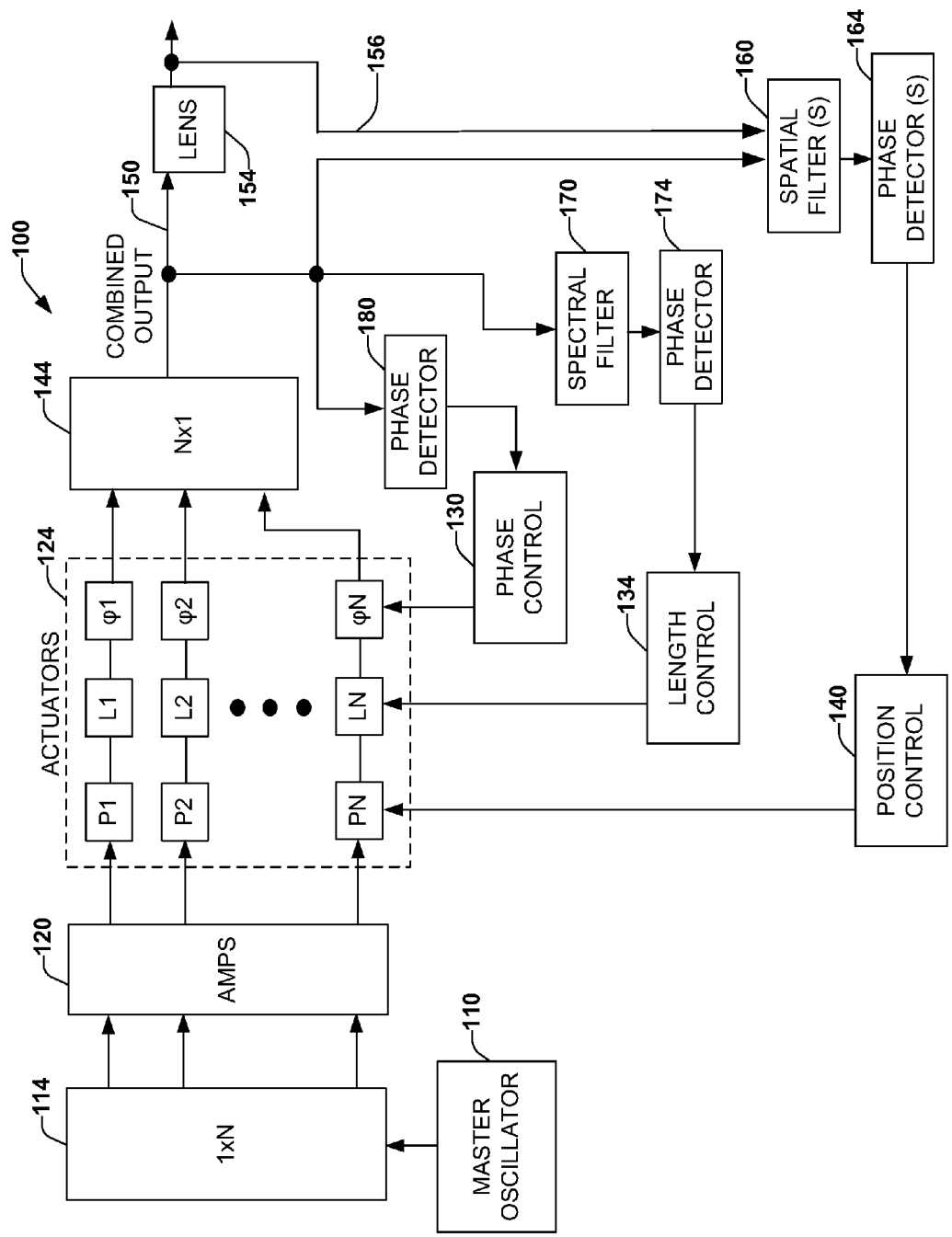
FIG. 1 illustrates a schematic block diagram of a laser control system in accordance with an aspect of the present invention.

FIG. 1 illustrates a laser control system 100 in accordance with an aspect of the present invention. The system 100 includes a master oscillator 110 for generating a primary laser signal. A beam splitter array 114 splits the primary laser signal from the master oscillator 110 into a plurality of secondary laser signals which are fed to a plurality of amplifiers 120 that amplify the secondary laser signals and generate a plurality of amplified laser signals. A plurality of actuators 124 adjust the position (via actuators marked P1-PN, with N being a positive integer), beam angle (via actuators marked P1-PN), path length (via actuators marked L1-LN, with N being a positive integer), and/or phase (via actuators marked φ1-φN, with N being a positive integer) of the amplified laser signals, wherein at least one control module controls the actuators that adjust the position, beam angle, path length, and/or phase of the amplified laser signals.

As shown, the control module can include a phase control 130 to control the phase of the amplified laser signals, a length control 134 to control a path length of the amplified laser signals, and a position control 140 to control a beam position and/or beam angle of the amplified laser signals. A combiner 144 receives the amplified laser signals from the actuators 124 to generate a combined laser output signal at 150. At least one filter samples the combined laser output signal 150 to generate a phase error as feedback for the length control 134 or the position control 140 to control at least one of the position, the beam angle, or the path length for the plurality of amplified laser signals.

In one example, the filter can be a spatial filter 160 that samples the combined output signal 150 to generate the phase error for the feedback to the position control 140. As shown, the spatial filter 160 can be followed by a phase detector 164 to convert tilt (e.g., difference in angles between two wavefronts) errors into phase or piston errors utilized as feedback for the position control 140. The spatial filter 160 provides a phase error that is related to a position of at least one of the amplified laser signals, wherein the position can be related to at least one of an X direction or a Y direction (where X and Y refer to spatial coordinates of the laser beam transverse to the direction of propagation) for at least one of the amplified laser signals appearing at the combiner 144. A lens 154 can be provided that transforms the combined laser output signal 150 to a transformed laser signal 156 (e.g., Fourier transform), wherein another spatial filter and detector pair (not shown) can sample the transformed laser signal 156 in order to generate a phase error that is related to a beam angle of at least one of the amplified laser signals, wherein the position control 140 can likewise control the beam angle via the actuators 124.

In another example, the filter sampling the combined output signal 150 can be a spectral filter 170 that generates the phase error as feedback via phase detector 174 to the length control 134, wherein the phase error is employed to control a path length for at least one of amplified laser signals. In one example, a fiber Bragg grating (FBG) can be employed to perform a spectral filtering function at 170 on the combined laser output signal 150. In another example, a pinhole detector having an aperture offset from the centroid of light sensed by the phase detector 180 can perform a spatial filtering function on the combined laser output signal at 160. The system 100 could also include a strain or temperature tuning mechanism that is applied to the FBG to change the spectral filter properties and thereby change the precision and control range for the plurality of amplified laser signals. As shown, a phase detector 180 can be employed to provide feedback to control phase via the phase control 130.

It is noted that a finite number of output filters and detectors can be employed to control a plurality of amplified laser signals, wherein the amplified laser signals can be increased from a small number (e.g., less than 10) to a substantially large array (e.g., >100 signals) without correspondingly scaling the number of detectors. For instance, a single phase detector 180 can be employed for phase control, a single spectral filter 170 and phase detector 174 combination can be employed for length control, and four spatial filter 160/phase detector 164 combinations can be employed for position (1 filter/detector for X dimension, 1 filter/detector for Y dimension, 1 filter/detector for beam angle in the X dimension and 1 filter/detector combination for beam angle in the Y dimension).

The position actuators P1-PN at 124 can include an adjustable mirror with angular control to control the position and/or beam angle. In another example, the actuators P1-PN at 124 can include a movable fiber to control the position and/or beam angle of at least one of the amplified laser signals. The length actuators L1-LN shown at 124 can include a multiple mirror configuration (e.g., mirrors to deflect light along a longer or shorter path) to control the path length of at least one of the of amplified laser signals. The length actuators L1-LN can also include an elastic fiber that contracts or expands to control the path length of at least one of the amplified laser signals. The phase actuators marked as φ1-φN at 124 can include an electro-optic waveguide, for example, to control the phase of at least one of the amplified laser signals. The control modules 130, 134, and 140 can employ standard phase control techniques that provide direct control to null out piston phase errors. Such techniques can include a heterodyne method, a hill-climbing method (e.g., stochastic parallel gradient descent, or SPGD), or a multi-dither method (e.g., locking of optical coherence by single-detector electronic-frequency tagging, or LOCSET) to perform phase locking on at least one of the amplified laser signals and to null out the phase error received at the input to the respective control modules.

The primary laser signal generated by the master oscillator 110 can be generated as a continuous wave (CW) signal or a pulsed wave (PW) signal. The master oscillator 110 can be a conventional laser, such as a gas laser, diode laser or a solid state laser, for example. The beam splitter array 114 can consist of a plurality of beam splitters which may be either free-space or fiber, for example. The beam combiner 144 can be, for example, a plurality of close-packed lenses or mirrors that collimate and tile the plurality of amplified light signals into a single composite high power output beam. The beam combiner 144 can also be, for example, a single or a plurality of free-space or fiber beam splitters that are used in reverse, such as a tapered fiber bundle or a diffractive optical element.

With high power laser arrays employing active phase control, the master oscillator 110 is often frequency modulated to broaden its linewidth for suppression of unwanted nonlinear effects. This leads to a requirement to match the optical path lengths in the laser array to within a small fraction of the coherence length to ensure substantially complete constructive interference and high efficiency coherent beam combining. If array paths are mismatched however, combining efficiency will be reduced. For typical linewidths of ~10 GHz, paths should be matched to within ~1 mm to hold combining losses to within 1%. However, it is difficult to fabricate and maintain 1 mm length accuracy in a high-power fiber amplifier chain in which fiber channel lengths can reach hundreds of meters. If linewidths broader than 10 GHz are required—as may be likely for combining multi-kW fiber lasers, for example, then the path matching tolerance is reduced proportionately. Thus, there is a need for active path-length control systems such as provided by the system 100 to maintain coherent combining efficiency and to enable combining of multi-kW fiber lasers.

With a large channel count array, it can be cumbersome to implement active path matching due to the difficulty of sensing the relative path mismatch. One proposed solution to this problem employs the mutual visibility as a metric for path matching. However, visibility is relatively insensitive to small mismatches and requires dithering of the path length in order to generate an error signal for feedback control. Thus, there is a need for a method of sensing path mismatches that provides high sensitivity and does not require dithering or multiple detectors. By sampling the combined output 150, employing spectral and spatial filters for path and position control, the system 100 provides a scalable system that can be automatically adjusted without conventional dithering calibration and the proliferation of detectors as employed by conventional systems. Thus the system 100 employs a single detector to provide feedback for multiple channels and can operate with both multi-dither (e.g., LOCSET) and hill-climbing (SPGD) phasing methods, for example. This includes automatic convergence to an optimal co-alignment to maximize combining efficiency along with fast convergence time (<<1 second) as needed for various systems. The system 100 also provides the ability to lock lasers with various linewidths, e.g., from 10 GHz to >1000 s of GHz. This can enable coherent combining of ~10 kW fiber lasers which are currently non-combinable. The system 100 can also provide path length locking stability of <10 um absolute with a locking range of >1 mm, for example.

Spectrally filtering both the light reaching the phase detector as well as the light reaching the path length detector can enable coherent locking of what can be considered de-phased light. In other words, lasers can be initially misaligned far beyond their natural coherence length so that they are dephased, yet the system 100 can still provide robust phase-locking and convergence to a suitable path-matching condition. The system 100 can also be applied to ultra-short light pulses as well as to continuous wave (CW) lasers. This can be useful for scaling to high field strengths in pulsed laser systems for fusion, high energy physics research, or for directed energy applications where peak field strength is desired, for example. As noted above, the system 100 can integrate strain or temperature tuning of the FBG to control the difference in power-weighted mean wavelength between light reaching the phase detector 180 and light reaching the phase detector 174, or wavelength shear. Initially the wavelength shear could be small to enable path control over a large range, and the shear could then be swept to a larger value to enable higher accuracy once the paths were initially adjusted, for example.

Figure 2:
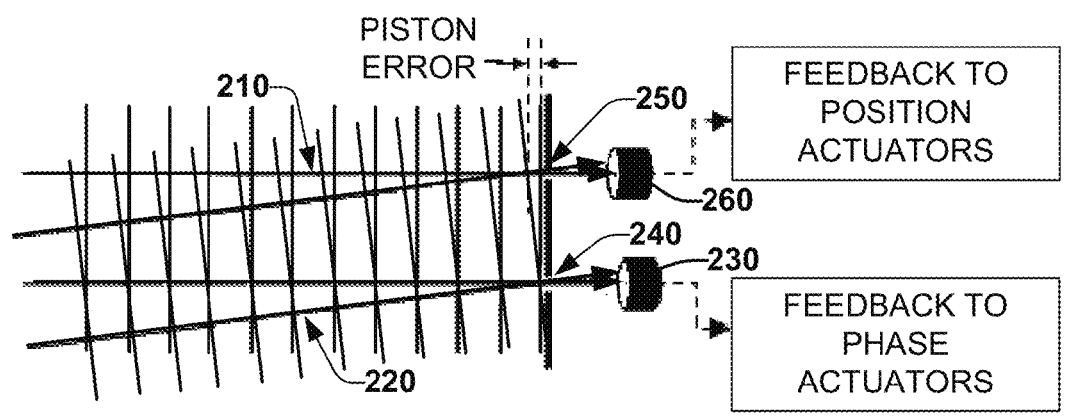
FIG. 2 illustrates a spatial filter for laser control in accordance with an aspect of the present invention.

FIG. 2 illustrates a spatial filter 200 for laser control in accordance with an aspect of the present invention. The spatial filter 200 can be applied to an array of phase locked beams 210 and 220 (only 2 beams shown for simplicity) and can convert spatial errors in beam pointing tilts into piston errors. The light sensed by a bottom phase detector 230 can be used to lock the phases of all lasers so that light passing the bottom spatial filter aperture at 240 is in-phase. If there are tilt offset errors between the beams 210 and 220, these spatial alignment errors can be transduced into piston phase offsets upon transmission through an aperture 250 at the top of the beam. If there are position offset errors between the beams 210 and 220, these spatial alignment errors can be transduced into tilt offset errors by inserting a Fourier transform lens (not shown) common to both beams 210 and 220, after which these spatial alignment errors can be transduced into piston phase offsets upon transmission through an aperture 250 at the top of the beam. A detector 260 senses the combined beat signal from all lasers, and standard phasing techniques isolate the error signals from individual lasers. Adjusting the relative beam positions to nullify these error signals corresponds to desired co-alignment of the beams.

Figure 3:
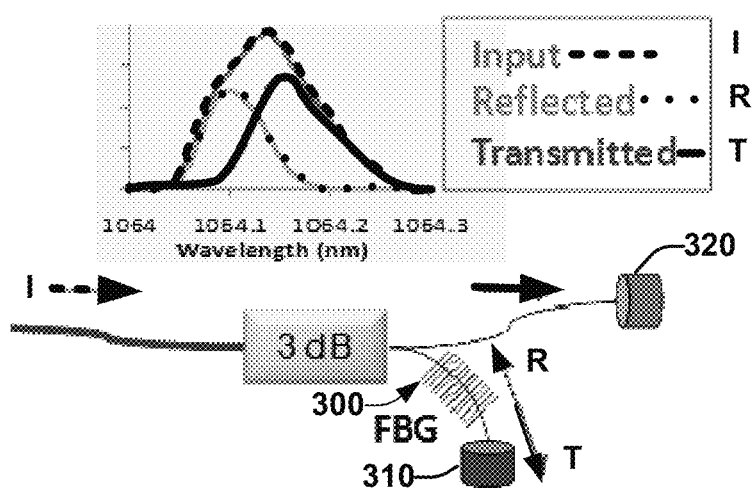
FIG. 3 illustrates a spectral filter for laser control in accordance with an aspect of the present invention.

FIG. 3 illustrates a spectral filter 300 for laser control in accordance with an aspect of the present invention. The spectral filter 300 (e.g., Fiber Bragg Grating) can be applied to an array of phase-locked beams to convert errors in beam path-matching (time of flight) into piston errors. As shown in this two detector example, the light sensed by detector 320 can be used to lock the phases of the lasers so that light reaching detector 320 is in-phase at the average unfiltered wavelength. If there are path-matching errors between the beams, these path-matching errors can be transduced into piston phase offsets upon transmission through a spectral filter 300 (e.g., Fiber Bragg Grating). A detector 310 senses the combined beat signal from the lasers, and standard phasing techniques isolate the error signals from individual lasers. Adjusting the relative beam path-lengths to nullify these error signals corresponds to desired path-matching of the beams.

Figure 4:
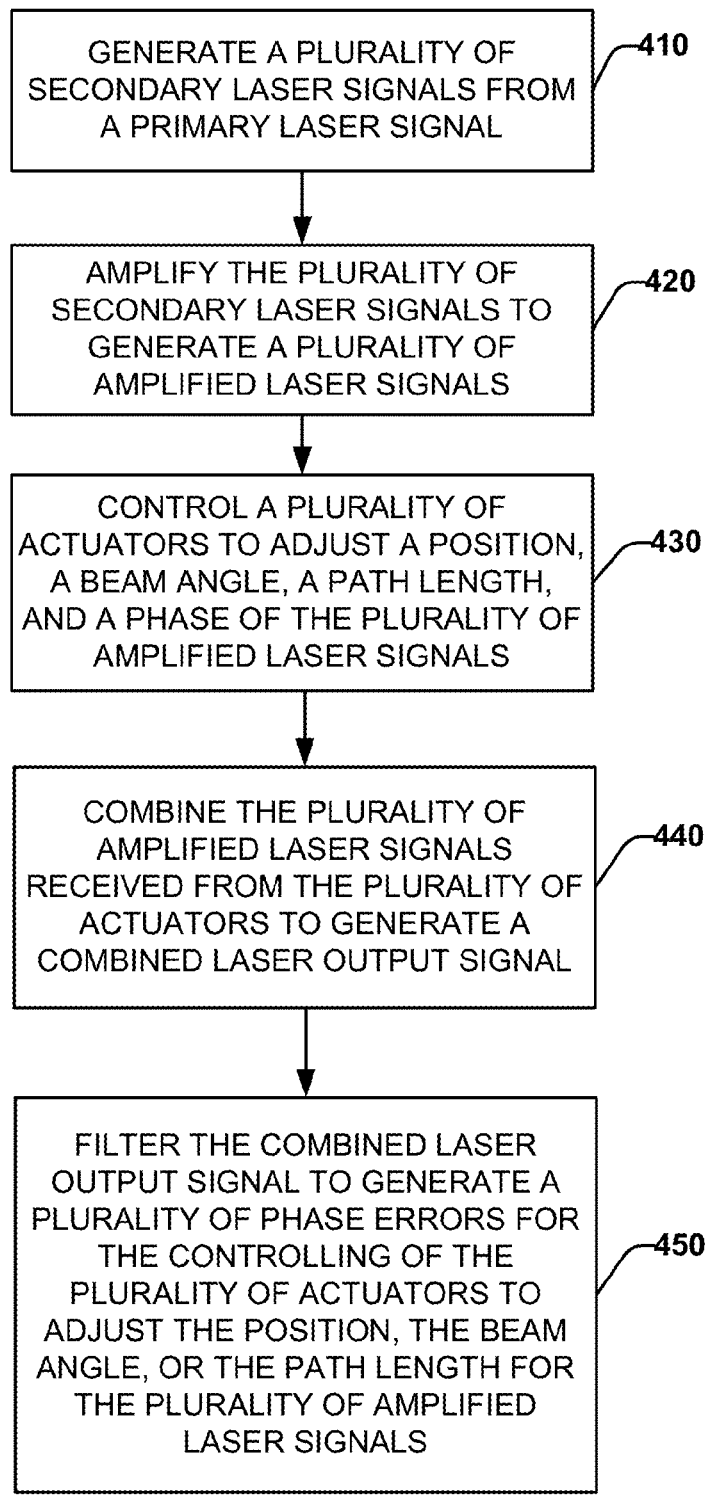
FIG. 4 illustrates a methodology for coherent beam combination and control in accordance with an aspect of the present invention.

In view of the foregoing structural and functional features described above, a methodology in accordance with various aspects of the present invention will be better appreciated with reference to FIG. 4. While, for purposes of simplicity of explanation, the methodology of FIG. 4 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 4 illustrates a methodology 400 for coherent beam combination and control in accordance with an aspect of the present invention. At 410, the method includes generating a plurality of secondary laser signals from a primary laser signal (e.g., via beam splitter 114 of FIG. 1). At 420, the method 400 includes amplifying the plurality of secondary laser signals to generate a plurality of amplified laser signals (e.g., via amplifiers 120 of FIG. 1). At 430, the method 400 includes controlling a plurality of actuators to adjust a position, a beam angle, a path length, and a phase of the plurality of amplified laser signals (e.g., via controls 130, 134, and 140 of FIG. 1). At 440, the method 400 includes combining the plurality of amplified laser signals received from the plurality of actuators to generate a combined laser output signal (e.g., via combiner 144 of FIG. 1).

At 450, the method 400 includes filtering the combined laser output signal to generate a plurality of phase errors for the controlling of the plurality of actuators to adjust the position, the beam angle, or the path length for the plurality of amplified laser signals (e.g., via spatial filer 160 or spectral filter 170 of FIG. 1). Other aspects include applying a spatial filtering function to the combined laser output signal to generate a plurality of phase errors for the controlling of the plurality of actuators to adjust the position or the beam angle for the plurality of amplified laser signals. This can include applying a spectral filtering function to the combined laser output signal to generate a plurality of phase errors for the controlling of the plurality of actuators to adjust the path length for the plurality of amplified laser signals. The primary laser signal can be a continuous wave laser signal or a pulsed wave laser signal. The method 500 can also include employing a movable fiber or a movable mirror in the actuators to control the path length, the position, or the beam angle.

Spectrally filtering the combined output beam transduces path-length mismatches between beams into piston phase errors. Consider two beams, i and k, derived from the same polychromatic master oscillator that are coherently overlapped with an optical path delay $L_{ik}$. Assume the beams are locked in-phase with each other at some power-weighted mean wavelength $\lambda_0$, corresponding to the power-weighted mean wavelength of light incident on the phase detector 488 in FIG. 4, for example. Since the beams are locked in phase modulo-$2\pi$ at $\lambda_0$, the path lengths of channels i and k can be mismatched by $L_{ik}=n_{ik}\lambda_0$ where $n_{ik}$ is an integer. The phase difference can then be written at any shifted power-weighted mean wavelength $\lambda_0+\Delta\lambda$, where the wavelength shift $\Delta\lambda$ is small in comparison to $\lambda_0$, such as in Equation 1:

$$\phi_{ik}(\lambda_0+\Delta\lambda) = \frac{2\pi L_{ik}}{\lambda_0+\Delta\lambda} = \frac{2\pi n_{ik}\lambda_0}{\lambda_0+\Delta\lambda} = 2\pi n_{ik}\left(1+\frac{\Delta\lambda}{\lambda_0}\right),$$
$$= \frac{2\pi L_{ik}\Delta\lambda}{\lambda_0^2}$$

where the last line has been taken to be modulo-$2\pi$. Hence, if the spectrally filtered light reaching the length detector has a shifted power-weighted mean wavelength $\lambda_0+\Delta\lambda$, then path-matching offsets $L_{ik}$ can be transduced into piston phase offsets that are proportional to the path-matching offsets $L_{ik}$. These piston offsets may be sensed by standard detection methods, and the errors signals fed back to path control actuators to null the piston offsets, hence nulling the path-matching offsets.

The same transduction of beam overlap into piston errors operates for beam tilts as well. For instance, consider two beams with relative angular misalignment of $\theta_{ik}$, locked in phase with a detector as shown in FIG. 2 located at the bottom of the beam. Due to the wave front tilts between the beams, their relative phase varies across the beam footprint. Basic geometry shows that the phase of light sampled by the top detector in FIG. 2 located a distance Ax from the bottom detector can be written as Equation 2:

$$\phi_{ik}(\Delta x) = \frac{2\pi}{\lambda_0}\theta_{ik}\Delta x$$

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

Having described the invention, the following is claimed:

1. A system comprising:
   a master oscillator for generating a primary laser signal;
   a beam splitter array for splitting the primary laser signal into a plurality of secondary laser signals;
   a plurality of amplifiers to amplify the plurality of secondary laser signals and generate a plurality of amplified laser signals;
   a plurality of actuators to adjust a position, a beam angle, a path length, and a phase of the plurality of amplified laser signals;
   at least one control module to control the plurality of actuators that adjust the position, the beam angle, the path length, and the phase of the plurality of amplified laser signals;
   a combiner that receives the plurality of amplified laser signals from the plurality of actuators to generate a combined laser output signal;
   a phase detector that samples the combined laser output signal to generate feedback for the control module to control the phase; and
   at least one filter that samples the combined laser output signal to generate a plurality of phase errors as feedback for the control module to control at least one of the position, the beam angle, or the path length for the plurality of amplified laser signals, the at least one filter comprising a spectral filter that samples the combined laser output signal to generate the plurality of phase errors for the feedback to the control module to control a path length for at least one of the plurality of amplified laser signals.

2. The system of claim 1, wherein the at least one filter is a spatial filter that samples the combined output signal to generate the plurality of phase errors for the feedback to the control module.

3. The system of claim 2, wherein the spatial filter provides a phase error that is related to a beam angle of at least one of the plurality of amplified laser signals and wherein the beam angle is related to at least one of an X direction or a Y direction for at least one of the plurality of amplified laser signals.

4. The system of claim 2, further comprising a lens that transforms the combined laser output signal to a transformed laser signal, wherein the spatial filter samples the transformed laser signal to generate a phase error that is related to a beam position of at least one of the plurality of amplified laser signals and wherein the beam position is related to at least one of an X direction or a Y direction for at least one of the plurality of amplified laser signals.

5. The system of claim 1, wherein the at least one filter is a fiber Bragg grating (FBG) to perform a spectral filtering function on the combined laser output signal or the at least one filter is a pinhole detector having at least one aperture to perform a spatial filtering function on the combined laser output signal.

6. The system of claim 5, wherein further comprising a strain or temperature tuning mechanism that is applied to the FBG to facilitate wavelength shear control for the plurality of amplified laser signals.

7. The system of claim 5, further comprising a mechanical tuning mechanism that is applied to the spatial filter aperture to facilitate positional shear control for the plurality of amplified laser signals.

8. The system of claim 1, wherein at least one of the plurality of actuators include an adjustable minor with angular control to control the position or beam angle of at least one of the plurality of amplified laser signals or at least one of the plurality of actuators include a movable fiber to control the position or beam angle of at least one of the plurality of amplified laser signals.

9. The system of claim 1, wherein at least one of the plurality of actuators include a multiple mirror configuration to control the path length of at least one of the plurality of amplified laser signals or at least one of the plurality of actuators include an elastic fiber that contracts or expands to control the path length of at least one of the plurality of amplified laser signals.

10. The system of claim 1, wherein at least one of the plurality of actuators include an electro-optic waveguide to control the phase of at least one of the plurality of amplified laser signals.

11. The system of claim 1, wherein the at least one control module includes a phase control, a length control, and a position control that employ a heterodyne method, a hill-climbing method, or a synchronous multi-dither method to perform phase locking on at least one of the plurality of amplified laser signals and to null out the phase error.

12. The system of claim 1, wherein the primary laser signal is generated as a continuous wave (CW) signal or a pulsed wave (PW) signal.

13. A system comprising:
a master oscillator for generating a primary laser signal;
a beam splitter array for splitting the primary laser signal into a plurality of secondary laser signals;
a plurality of amplifiers to amplify the plurality of secondary laser signals and generate a plurality of amplified laser signals;
a plurality of actuators to adjust a position, a beam angle, a path length, and a phase of the plurality of amplified laser signals;
a phase control module to control a subset of the plurality of actuators that adjust a phase of the plurality of amplified laser signals;
a length control module to control a subset of the plurality of actuators that adjust a path length of the plurality of amplified laser signals;
a position control module to control a subset of the plurality of actuators that adjust a beam position or beam angle of the plurality of amplified laser signals;
a combiner that receives the plurality of amplified laser signals from the plurality of actuators to generate a combined laser output signal;
a phase detector that samples the combined laser output signal to generate feedback for the phase control module, the length control module, and the position control module;
a spectral filter that samples the combined laser output signal to generate a first phase error as feedback for the length control module to control the path length for the plurality of amplified laser signals; and
a spatial filter that samples the combined laser output signal to generate a second phase error as feedback for the position control module to control the beam position or the beam angle for the plurality of amplified laser signals.

14. The system of claim 13, wherein the spectral filter is a fiber Bragg grating (FBG) to perform a spectral filtering function on the combined laser output signal and the special filter is a pinhole detector having at least two apertures to perform a spatial filtering function on the combined laser output signal.

15. A method comprising:
generating a plurality of secondary laser signals from a primary laser signal;
amplifying the plurality of secondary laser signals to generate a plurality of amplified laser signals;
controlling a plurality of actuators to adjust a position, a beam angle, a path length, and a phase of the plurality of amplified laser signals;
combining the plurality of amplified laser signals received from the plurality of actuators to generate a combined laser output signal;
filtering the combined laser output signal to generate a plurality of phase errors for the controlling of the plurality of actuators to adjust the position, the beam angle, or the path length for the plurality of amplified laser signals; and
applying a spatial filtering function to the combined laser output signal to generate a phase error for the controlling of the plurality of actuators to adjust the position or the beam angle for the plurality of amplified laser signals.

16. The method of claim 15, further comprising applying a spectral filtering function to the combined laser output signal to generate a phase error for the controlling of the plurality of actuators to adjust the path length for the plurality of amplified laser signals.

17. The method of claim 15, wherein the primary laser signal is a continuous wave laser signal or a pulsed wave laser signal.

18. The method of claim 15, further comprising employing a fiber or a minor in the actuators to control the path length, the position, or the beam angle.

\* \* \* \* \*